(12) United States Patent
Campbell et al.

(10) Patent No.: US 8,341,189 B2
(45) Date of Patent: Dec. 25, 2012

(54) EXTENDING COLLABORATION CAPABILITIES TO EXTERNAL DATA

(75) Inventors: Jonathan Campbell, Kenmore, WA (US); Eray Chou, Seattle, WA (US); Howard M. Crow, III, Sammamish, WA (US); Peter K. Harwood, Snoqualmie, WA (US); Todd Haugen, Clyde Hill, WA (US); Christopher Foster Johnson, Redmond, WA (US); Mohammed Nazeeruddin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 12/415,499

(22) Filed: Mar. 31, 2009

(65) Prior Publication Data

US 2010/0250609 A1  Sep. 30, 2010

(51) Int. Cl.
  *G06F 17/30* (2006.01)
(52) U.S. Cl. ........................................ 707/795; 707/948
(58) Field of Classification Search .................... 707/948
  See application file for complete search history.

(56) References Cited

U.S. PATENT DOCUMENTS

| | | | |
|---|---|---|---|
| 7,020,880 B2 | 3/2006 | Mellen-Garnett et al. | |
| 7,039,597 B1 | 5/2006 | Notani et al. | |
| 7,139,798 B2 * | 11/2006 | Zircher et al. | 709/204 |
| 2003/0004829 A1 * | 1/2003 | Torres et al. | 705/26 |
| 2003/0225778 A1 * | 12/2003 | Fisher et al. | 707/102 |
| 2004/0015366 A1 * | 1/2004 | Wiseman et al. | 705/1 |
| 2004/0128347 A1 | 7/2004 | Mason | |
| 2006/0036954 A1 | 2/2006 | Satyadas | |
| 2006/0036998 A1 | 2/2006 | McKenna et al. | |
| 2007/0100845 A1 * | 5/2007 | Sattler et al. | 707/100 |
| 2007/0250784 A1 * | 10/2007 | Riley et al. | 715/764 |
| 2008/0071642 A1 * | 3/2008 | Leiba | 705/27 |
| 2008/0091448 A1 | 4/2008 | Niheu et al. | |
| 2008/0250062 A1 * | 10/2008 | Huang et al. | 707/103 R |

OTHER PUBLICATIONS

Homan, Practical Introduction to SharePoint 2007, http://www.dinamikainc.com/sharepoint/Practical%20Introduction%20to%20SharePoint%202007.pdf; Jun. 15, 2008, pp. 1-6.
Introduction to Business Data Catalog Features, http://office.microsoft.com/en-us/sharepointserver/HA102200501033.aspx; Jan. 15, 2009, pp. 1-7.
Robinson, 10 Things You Should Know: Microsoft's SharePoint Services, http://articles.techrepublic.com.com/5100-10878_11-5807000.html ; Jul. 27, 2005, pp. 1-5.
Waqas, SharePoint—Introduction to the Business Catalog (BDC), http://www.beyondweblogs.com/post/SharePoint-Introduction-to-the-Business-Data-Catalog-(BDC).aspx; Sep. 22, 2008, pp. 1-6.

(Continued)

*Primary Examiner* — Charles Kim
*Assistant Examiner* — Grace Park
(74) *Attorney, Agent, or Firm* — Merchant & Gould

(57) ABSTRACT

A computing device includes instructions that, when executed by a processing unit, cause the processing unit to: create a business data catalog module that accesses and manipulates data residing on an internal data store and an external data store, wherein the business data catalog module receives a request for data, determines whether the data resides in the internal data store or the external data store, and access the data residing on the external data store, and create a external data provisioning module that provisions data accessed from the external data store, wherein the external data provisioning module maps external data from the external data store for presentation on a client computing device. A user can access and manipulate the data from the external data store in a same manner as accessing and manipulating data from the internal data store.

20 Claims, 9 Drawing Sheets

OTHER PUBLICATIONS

Shafiq et al., Using the Business Data Catalog Editor Tool, http://www.wrox.com/WileyCDA/WroxTitle/Using-the-Business-Data-Catalog-Editor-Tool.productCd-0470478438.html?print=true; Dec. 2008, pp. 1-2.

Caulk, Visual Fusion Server 3.0; Jan. 2008 ; 17 pages.
Sonic Collaboration Server; Nov. 2005; 4 pages.
International Search Report and Written Opinion in PCT/US2010/028937 mailed Nov. 9, 2010; 9 pages.

* cited by examiner

EXTENDING COLLABORATION CAPABILITIES TO EXTERNAL DATA

BACKGROUND

In modern enterprise computing system implementations, business data can be distributed across multiple data stores. For example, a user can require access to multiple "Line-of-Business" data stores to acquire knowledge about business activities, such as information about customers and other business-related data. These Line-of-Business data stores can be spread across a system and can also be located externally from the system.

A user who leverages such data systems and other business processes may be required to frequently navigate across multiple external business systems over the course of day-to-day operations. Maneuvering between external business systems and fetching content from external data stores can be complex and costly, from both an administrative and a user perspective.

SUMMARY

In one aspect, a computing device includes a processing unit, and a system memory connected to the processing unit, the system memory comprising instructions that, when executed by the processing unit, cause the processing unit to: create a business data catalog module that accesses and manipulates data residing on an internal data store and an external data store, wherein the business data catalog module receives a request for data, determines whether the data resides in the internal data store or the external data store, and access the data residing on the external data store; and create a external data provisioning module that provisions data accessed from the external data store, wherein the external data provisioning module maps external data from the external data store for presentation on a client computing device. A user can access and manipulate the data from the external data store in a same manner as accessing and manipulating data from the internal data store.

In another aspect, a method for obtaining business data includes: receiving a request for data from a data store; determining if the data resides on an internal data store or an external data store; when the data resides on the external data store, accessing external data on the external data store; mapping the external data from the external data store; and presenting the external data from the external data store to a user in a same manner as internal data from the internal data store.

In yet another aspect, a computer readable storage medium having computer-executable instructions that, when executed by a computing device, cause the computing device to perform steps including: creating definitions of business objects that encapsulate a set of defined attributes related to the business objects; accessing definitions of entities and performing an inventory of the attributes defined therein; receiving a request for data from a data store; determining if the data resides on an internal data store or an external data store; when the data resides on the external data store, accessing external data on the external data store using one or more API calls specific to the external data store; mapping the external data from the external data store; generating forms and views for presentation to the user of the client computing device, wherein the views and forms contain content that is consistent with permissible operations embodied in APIs of an external business system associated with the external data store; presenting the external data from the external data store to a user in one of the views or forms in a same manner as internal data from the internal data store; and allowing the user to manipulate the external data store in a same manner as manipulating the internal data from the internal data store.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present application is directed to systems and methods for integrating data housed in one or more external data stores into a preferred business software platform. The externally housed data is presented to a user as if the data were native to the preferred business software platform. The user can perform operations on the data according to one or more predefined constraints.

Examples described herein include data stores that are "internal" and data stores that are "external." Data stores that are "internal" are stores located within a system or enterprise and accessible only within the system or enterprise because of, for example, security measures such as firewalls. Data stores that are "external" are stores that are accessible outside the system or enterprise through, for example, a network such as the Internet.

The following example embodiments are described herein with respect to the SHAREPOINT® team services portal server services platform from Microsoft Corporation of Redmond, Wash. However, the concepts of the present disclosure are also applicable to other systems in which it would be desirable to integrate externally-located data into a software platform.

Figure 1:
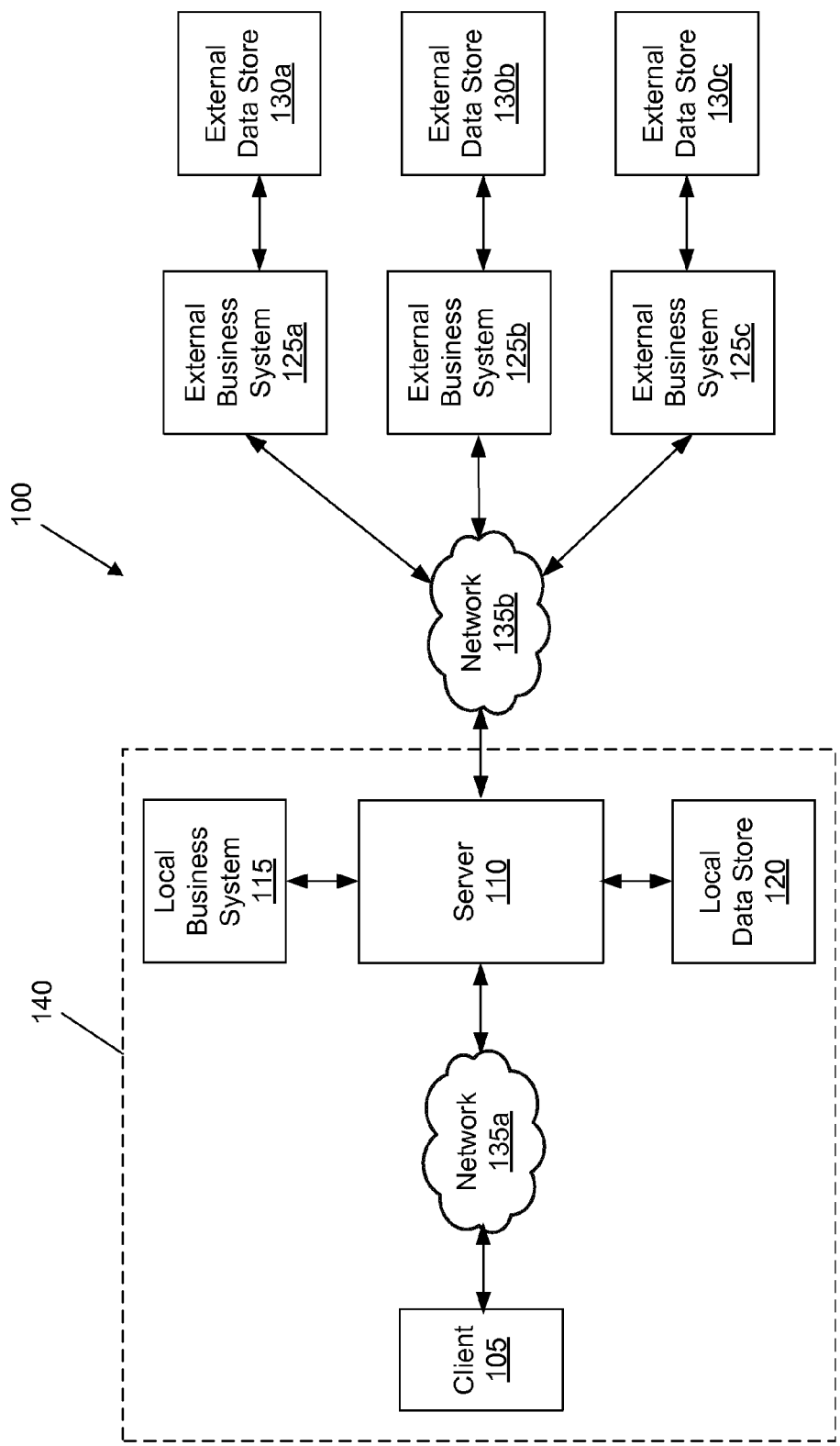
FIG. 1 shows an example networked computing system.

FIG. 1 shows an example networked computing system 100 including data housed in both internal and external data stores that are accessed by a business software platform. The terms "system" and "platform" generally refers to any hardware architecture and/or software framework that enables computer software to execute program modules, algorithms, operations, and tasks on one or more computing devices that may be interconnected in a networked environment.

The example networked computing system 100 includes a client computing device 105, a server computing device 110, a local business system 115, a local data store 120, a plurality of external business systems 125a-c (collectively, external business systems 125), and external data stores 130a-c (collectively, external data stores 130). Additionally, a first communication network 135a and a second communication network 135b (collectively, communication network 135) are shown. Other embodiments of example networked computing environment 100 are possible as well.

The communication network 135 is a bi-directional data communication path for data transfer between one or more computing devices. In the example embodiment, the first communication network 135a establishes an internal communication path for data transfer between the client computing device 105 and the server computing device 110. The second communication network 135b establishes an external communication path for data transfer between the server computing device 110 and the external business systems 125.

In general, communication network 135 can be of any of a number of wireless or hardwired WAN, LAN, Internet, or other packet-based communication networks such that data can be transferred among the elements of example environment 100. Other embodiments of communication network 135 are possible as well.

In the example shown, the network 135a is a network that is located internally with respect to a business data platform 140. The network 135a is "internal" because the network 135a is a LAN or WAN that is only accessible to the devices 105, 110 and other devices located behind security provisions, such as a firewall, associated with the business data platform 140.

The network 135b is a network that is accessible by a plurality of computing devices outside of the business data platform 140. For example, the network 135b can be the Internet or another network that is accessible outside of the business data platform 140.

The computing devices 105, 110 can be general purpose computing devices, as described below. In the example shown, the server computing device 110 is a business server that can implement business processes. Example business processes include data collaboration processes, data management processes, and others. The server computing device 110 can include of a plurality of interconnected server computing devices operating together to implement business processes.

The local business system 115 is a computing device that includes one or more business systems that provide business applications. The local business system 115 typically includes business logic that operates on data located in one or more data stores, such as the local data store 120, described in further detail below. One example local business system is Windows SharePoint Services 3.0 provided by Microsoft Corporation. Other embodiments of local business system 115 are possible as well.

The local data store 120 is a data storage medium such as a relational data store or any other type of persistent data storage device. The local data store 120 stores data in a predefined format such that the server computing device 110 can query, modify, and manage data stored thereon. For example, the local data store 120 can be an XML-enabled database such as a structured query language (SQL) database. In certain embodiments, the local data store 120 can comprise of a plurality of data storage devices logically grouped together into an interconnected "Farm" configuration. Other embodiments of the local data store 120 are possible as well.

As depicted in FIG. 1, the client computing device 105, server computing device 110, local business system 115, and local data store 120 are logically grouped together within the business data platform 140 to functionally operate as a business software platform. For example, a user can interact with a Web browser application on the client computing device 105 to leverage functionalities of the respective devices 110, 115 and local data store 120 as a tool for business data management and collaboration with one or more other users operating within the business data platform 140.

One example embodiment of such a business data platform is the SHAREPOINT® team services portal server services platform from Microsoft Corporation. In the example embodiment, a platform component may be embodied as Office SharePoint Server 2007, and a services component may be embodied as Windows SharePoint Services 3.0, respectively. Other embodiments of the business data platform 140 are possible as well.

External business systems 125 are similar to the local business system 115, as described above, with the exception of operating outside the business data platform 140. Each respective external business system 125a-c can include one or more business systems that provide business applications.

For example, one or more of the external business systems 125a-c can be an enterprise resource planning (ERP) system from SAP America, Inc. of Newtown Square, Pa., or another general customer relationship management system. In general, each of the respective external business systems 125a-c can be of any type of Line-of-Business system that includes an external service or software system with business logic operating on data located in a relational data store or any other type of persistent data storage device.

In the example embodiment, each of the respective external business systems 125a-c is communicatively connected to respective external data stores 130a-c. The external data stores 130 can be configured in a manner similar to that of local data store 120, as described above, where each respective external data store 130a-c is formatted such that a corresponding external business system 125a-c can operate on data stored thereon. Other embodiments of external data stores 130 are possible as well.

In a similar manner as described above with respect to the elements of the business data platform 140, a user can interact with a Web browser application on the client computing device 105 to leverage functionalities of the server computing device 110, external business systems 125, and external data stores 130 as a tool for business data management and collaboration with one or more other users that are operating within the context of the business data platform 140.

While the external business systems 125 and external data stores 130 are located outside of the business data platform 140, the server computing device 110 of the present disclosure is configured to integrate the functionality of external business systems 125 into the business data platform 140.

For example, as described in further detail below, the server computing device 110 can be configured to implement a mapping operation in which external business data is brought into the context of the business data platform 140. In this example, the server computing device 110 implements a plurality of methods for presenting and operating on respective external business data, which are similar to methods for presenting and operating on business data that is housed internal to the business data platform 140. In this manner, external business data is presented to the user and operated on as if it were native (i.e., internal) to the business data platform 140.

Figure 2:
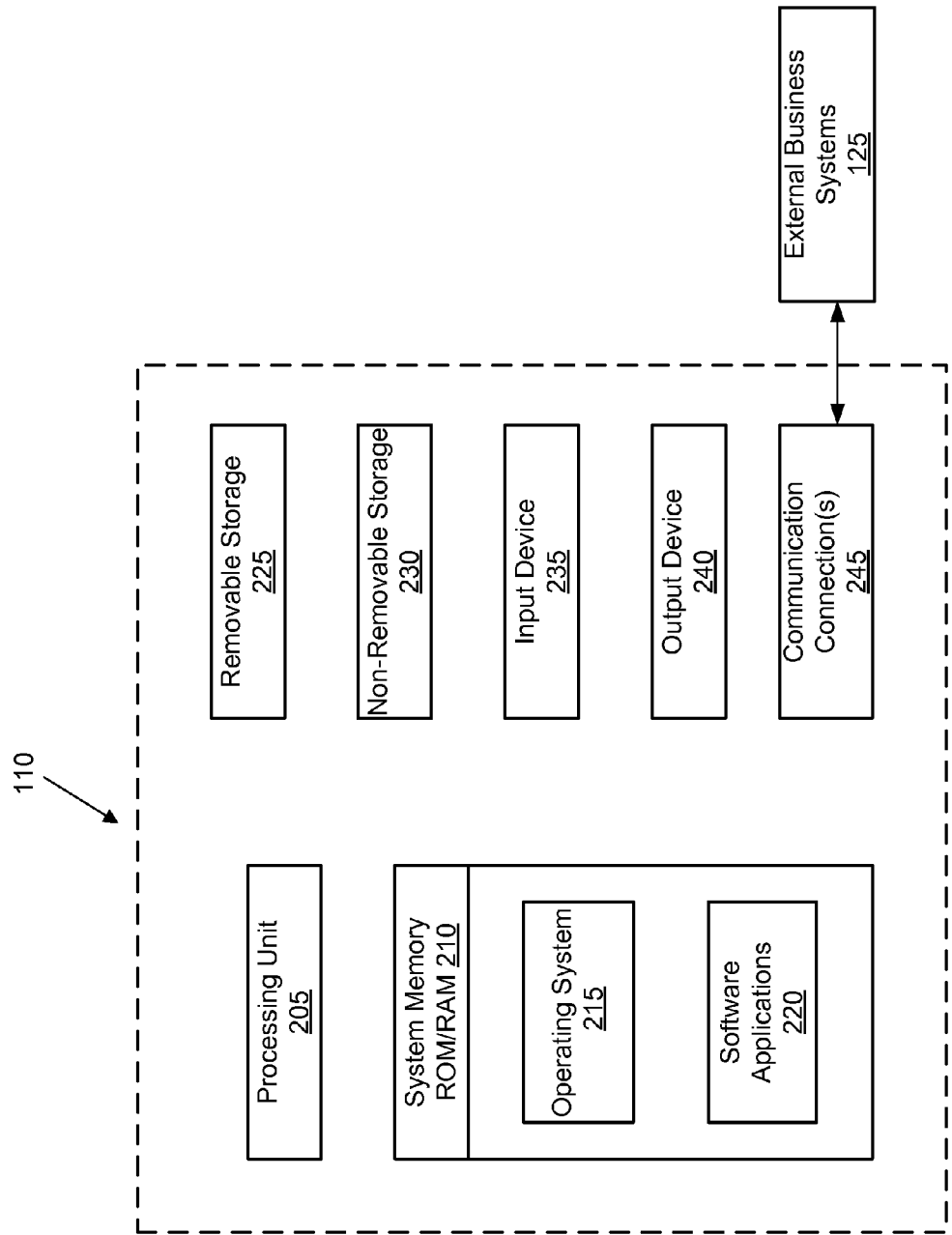
FIG. 2 shows an example server computing device from the system of FIG. 1.

FIG. 2 shows a detailed view of the server computing device 110 of FIG. 1. As mentioned above, in the example shown, the server computing device 110 is a computing device that includes at least one processing unit 205 and system memory 210.

For example, the server computing device 110 can be a desktop computer, laptop computer, or personal data assistant. The server computing device 110 can include any number of input/output devices, a central processing unit (CPU), a data storage device, a network device, and any other functional devices to otherwise process and transfer data.

Depending on the configuration and type of computing device, the system memory 210 may be volatile (e.g., RAM), non-volatile (e.g., ROM, flash memory, etc.) or any combination thereof. The system memory 210 can store an operating system 215 for controlling the operation of a computing device. One example operating system 215 is the WINDOWS® operating system from Microsoft Corporation, or a server, such as Microsoft Office SharePoint Server 2007, also from Microsoft Corporation.

The system memory 210 may also include one or more software applications 220 and may include program data. Software applications 220 may include many different types of single and multiple-functionality programs, such as an electronic mail program, a calendaring program, an Internet browsing program, a spreadsheet program, a program to track and report information, a word processing program, and many others. One example program is the Office suite of applications from Microsoft Corporation.

The server computing device 110 can have additional features or functionality. For example, the server computing device 110 may also include additional data storage devices (removable and/or non-removable) such as, for example, magnetic disks, optical disks, or tape. Such additional storage is illustrated in FIG. 2 by removable storage 225 and non-removable storage 230. Computer readable storage media may include physical volatile and nonvolatile, removable and non-removable media implemented in any method or technology for storage of information, such as computer readable instructions, data structures, program modules, or other data. The system memory 210, removable storage 225 and non-removable storage 230 are all examples of computer readable storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computing device 110. Any such computer storage media may be part of the server computing device 110.

The server computing device 110 can also have input device(s) 235 such as keyboard, mouse, pen, voice input device, touch input device, etc. Output device(s) 240 such as a display, speakers, printer, etc. may also be included.

The server computing device 110 can also contain a communication connection 245 that enable communications with other computing devices (e.g., clients, servers, databases), such as external business systems 125, over a network (e.g., communication network 135 of FIG. 1) in a networked, distributed computing environment. The communication connection 245 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

In example embodiments, the client computing device 105 of FIG. 1 can be configured in a manner similar to that of the server computing device 110, as described above. The client computing device 105 can also contain a Web browser application that renders a graphical user interface. In this manner, a user can interact with online content via a Web page. In example embodiments, the Web browser application is a client program that uses HTTP (Hypertext Transfer Protocol) to make requests of Web servers for online content. One example of such a Web browser application is the INTERNET EXPLORER® internet browser, from Microsoft Corporation.

In general, example system 100 can include a plurality of client computer devices 105 and server computing devices 110. Other embodiments of client computing device 105 and the server computer device 110 are possible as well.

Figure 3:
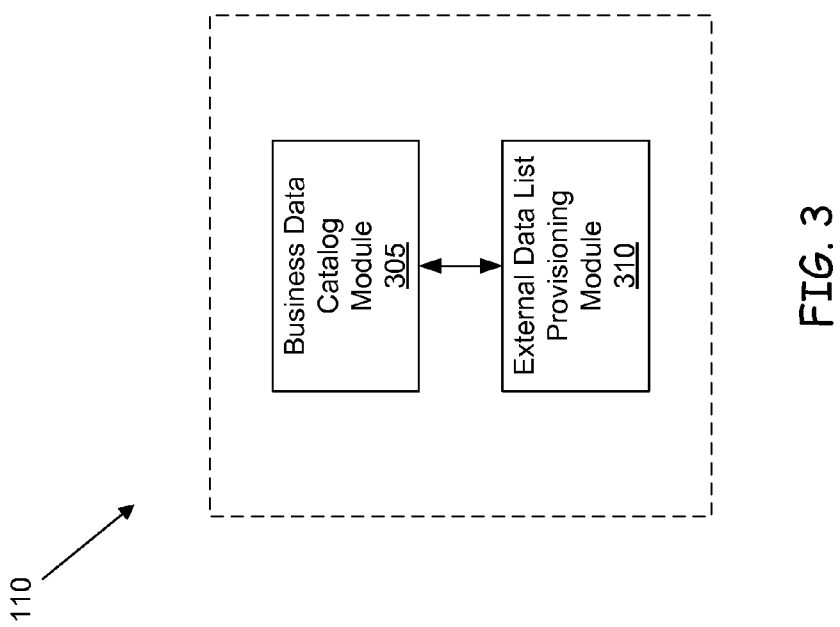
FIG. 3 shows example logical modules of the server computing device of FIG. 2.

FIG. 3 shows example logical modules of the server computing device 110 of FIG. 2. The server computing device 110 includes an example business data catalog (BDC) module 305 and an example external data list provisioning (EDL) module 310.

The BDC module 305 and EDL module 310 operate together to integrate business data residing on external data stores 130 within the context of business data platform 140. For example, in one embodiment, the BDC module 305 and the EDL module 310 together generate and render an "external data list" of business data gathered from external data store 130a on a graphical user interface of a Web browser application running on the client computing device 105. The user of the client computer device 105 can access and/or manipulate this external business data in a same manner as the user can access and manipulate data residing internal to the business data platform 140.

The example BDC module 305 includes logical modules of software executing on the server computing device 110 that enable the BDC module 305 to access and/or manipulate data residing on the external data stores 130. In general, when a user, interacting with a Web browser application via the client computing device 105, requests data, the BDC module 305 receives the request and makes a determination of whether the requested data resides internally or externally with respect to the business data platform 140. Upon, evaluating the status of the requested data, the BDC module 305 processes the data request.

In example embodiments, when the data request is associated with business data residing external to the business data platform 140, the BDC module 305 fetches the business data of various data types from external data stores 130 by using application programming interface (API) calls which are supported by respective external business systems 125, as the business logic of external business systems 125 are represented through a facade of APIs. In example embodiments, respective APIs of each respective external business system 125a-c define permissible operations along with one or more pre-defined constraints for otherwise rendering and operating on business data residing in respective external data stores 130a-c.

In one aspect, information about APIs associated with respective external business systems 125a-c are contained in data stored in the local data store 120 that can be accessed by the BDC module 305. Additionally, other data that is associated with each respective external business system 125a-c can be stored in the local data store 120 as well, including various parameters and definitions of constructs that the BDC module 305 leverages to access and obtain data from external data stores 130.

For example, this data can include data related to entities, methods, parameters and parameter descriptors associated with each method, security authorization information, filtering information, and parameters associated with each of the respective external business systems 125 and external data stores 130. Additionally, local data store 120 can contain data describing the types of data stored in each of the respective external data stores 130.

The example EDL module 310 includes logical modules of software running on the server computing device 110 that enables the EDL module 310 to provision business data housed in external data stores 130 within the context of business data platform 140. For example, the EDL module 310 includes algorithms that map external business data to "views" and "forms" for presentation on the client computing device 105 via a Web browser application. In one aspect, provisioning of external business data refers to a process of making configurations to bring about changes in a product.

In example embodiments, a "view" corresponds to methods for displaying external business data based on a configuration of respective external business systems 125 and corresponding external data stores 130, according to data stored in local data store 120, as described above. A "form" corresponds to methods for data to update external business data stored in respective external data stores 130. In this manner, provisioned views and forms contain content that are consistent with the permissible operations embodied in the APIs of the respective external business systems 125, and enable external business data to be accessed and modified via permissible CRUDQ operations (create, read, update, delete and query operations), as described in further detail below.

Figure 4:
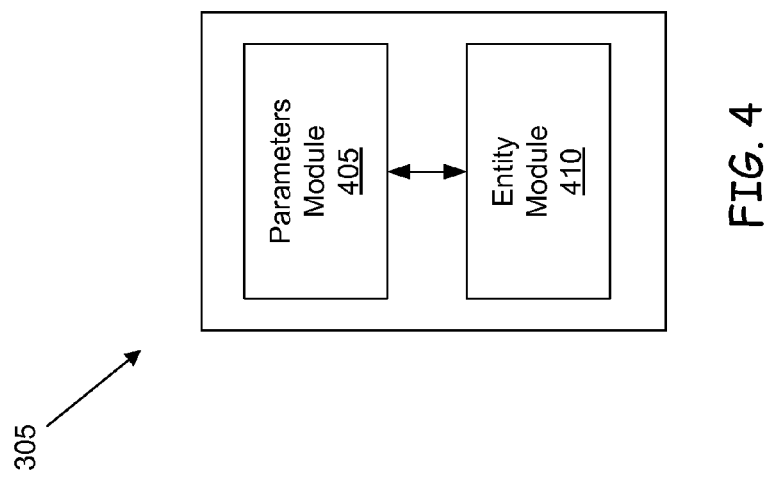
FIG. 4 shows example logical modules of an example business data catalog module of FIG. 3.

FIG. 4 shows a detailed view of example logical modules of the BDC module 305 of FIG. 3. In example embodiments, the BDC module 305 includes an example parameters module 405 and an example entity module 410.

The parameters module 405 comprises software that accesses connection parameters and definitions of a plurality of business systems that the BDC module 305 can model and access as a source of business data and business logic. In example embodiments, respective business system specific connection parameters and definitions are contained in data stored in the local data store 120 that can be accessed by the parameters module 405.

In general, business systems can be defined to exist both within and outside of the context of business data platform 140. For example, connection parameters and definitions for local business system 115 and respective external business systems 125*a-c* may be defined. Furthermore, the BDC module 305 is extensible in that new business systems with respective parameters and definitions may be defined at any time.

The entity module 410 comprises software that creates definitions of business objects that encapsulate a set of defined attributes related to a business object, referred to as an entity. In example embodiments, entities and associated attributes are contained in data stored in the local data store 120 that can be accessed by the entity module 410.

In general, an instance of an entity contains data members that may be of a simple type that represent scalar types such as integers and strings, or a complex type that represents a structured field, such as an Address. For example, an entity instance such as "Customers" or "Employees," can include a tabular list data. In the example embodiment, the "Customers" entity instance can include a tabular list of data comprising columns that contain fields such as Customer Name, Orders, Products, and Addresses, where the tabular list would include data members assigned to each respective column and row.

In one aspect, entity attributes can comprise of a plurality of definitions that dictate how fields and respective data members related to a specific entity are accessed, modified, and rendered. For example, entity attributes related to methods assigned to CRUDQ operations can dictate allowable CRUDQ operations and related functionalities. For example, if a method of a type "Creator" is defined within the attributes of an entity, creation of a new instance of entity is allowed. Furthermore, as described in further detail below, CRUDQ operations can be logically grouped into a View Group, that enables provisioning of each of respective views and forms associated with the entity.

The provisioned views and forms will have related functionalities associated with, for example, the defined methods assigned to CRUDQ operations within a View Group. For example, if a "Creator" method is defined within a View Group of an entity, a "New" menu item may be provisioned on a Web page that a user may select to create a new entity instance. Other example methods include a method of a type "Finder" or "Specific Finder" that correspond to a view; a method of a type "Updater" that allows for update of one or more properties of a specific entity instance; and a method of a type "Deleter" that allows for deletion of a specific entity instance.

As mentioned above, in certain embodiments, methods assigned to CRUDQ operations for respective views and forms can be logically grouped together into a View Group. In general, an entity may contain multiple view groups. For example, one specific view of a "Customers" entity instance may correspond to a set of columns that can include "First Name" and "Last Name" and a "Company Name." In certain embodiments, this specific view may only support a viewing operation, in which the associated View Group would only contain a method of type "Finder" or "Specific Finder," as described in further detail below.

In example embodiments, other types of defined entity attributes are possible as well. For example, an "Identifier" attribute can be defined that represents a persistent identity of a specific entity, such as a primary key, such that a respective entity can be identified. Further, a "FilterDescriptor" attribute can be defined that includes criteria for filtering data members that are returned after an invocation of a method assigned to a respective CRUDQ operation. Several example filtering criteria include a "PageNumber" criteria, a "Wildcard" criteria, a "Comparison" criteria, and others. Additionally, an "Actions" attribute can be defined that includes actions that are references to a URL that are might be related to the entity.

Further, a "Relationships" attribute can be defined that contains references to one or more entities that an association is defined on. In example embodiments, associations represent relationships between one or more entities. Additionally, an "Access" attribute can be defined that includes methods an administrator can leverage to set access rights on (i.e., CRUDQ operations). Many other methods or types of entity attributes may be defined as well.

Figure 5:
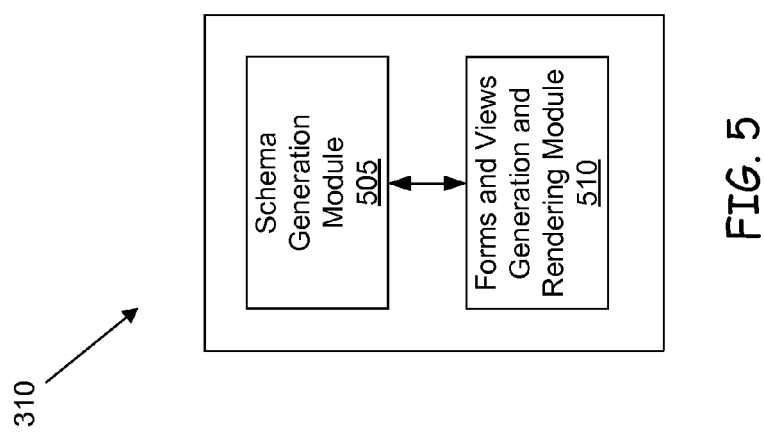
FIG. 5 shows example logical modules of an example external data list provisioning module of FIG. 3.

FIG. 5 shows a detailed view of logical modules of the example EDL module 310 of FIG. 3. In example embodiments, the EDL module 310 includes an example schema generation module 505, and an example forms and views generation and rendering (FVGR) module 510.

In one aspect, the example schema generation module 505 and the FVGR module 510 enable the EDL module 310 to integrate business data housed in external data stores 130 into the context of business data platform 140 by mapping respective business data to views and forms for presentation to a user via a graphical user interface instantiated by a Web browser application on the client computing device 105. According to the principles of the present disclosure, the provisioned views and forms contain content that are consistent with the permissible operations embodied in the APIs of respective external business systems 125, as obtained by the BDC module 305.

In one aspect, the schema generation module 505 comprises software that accesses definitions of entities as defined in entity module 410, as described above. In general, the schema generation module 505 accesses a respective entity and all associated attributes as contained in data stored in the local data store 120. For example, the schema generation module 505 may receive a request to access an entity "Customers" and perform an inventory of the attributes defined therein. In the example embodiment, the "Customers" entity may be defined within the context of business data platform 140, and therefore as a default may contain all methods associated with standard CRUDQ operations, including the "Creator" method, the "Specific Finder" method, the "Updater" method, and the "Deleter" method. Accordingly, upon request, the schema generation module 505 would perform an inventory that would reflect the presence of the recited CRUDQ methods of the "Customers" entity.

As another example, the schema generation module 505 may receive a request to access an entity "Employees" and perform an inventory of the attributes defined therein. In the example embodiment, the "Employees" entity may be defined outside of the context of business data platform 140, and therefore may not contain all of the CRUDQ methods. For example, the "Employees" entity may not include the "Creator" method, and therefore, upon request, the schema generation module 505 would inventory that the "Employees" entity as only having the "Specific Finder" method, the "Updater" method, and the "Deleter" method.

The FVGR module 510 comprises software that accesses schema generation module 505 to request an inventory of attributes defined within a respective entity. Subsequently, based on an ascertained inventory, the FVGR module 510 generates forms and views for later presentation to a user of client computing device 105 via a graphical user interface instantiated by a Web browser application. In this manner, the provisioned views and forms contain content that are consistent with the data types of external business data residing on respective external data stores 130 and business permissible operations embodied in the APIs of respective external business systems 125, as obtained by the BDC module 305.

For example, with respect to the entity "Customers" as described above, the FVGR module 510 accesses the schema generation module 505 to request an inventory of the attributes of the entity "Customers." In the example embodiment, the schema generation module 505 would perform the inventory and return the defined attributes, including the "Creator" method, the "Specific Finder" method, the "Updater" method, and the "Deleter" method.

Subsequently, the FVGR module 510 creates forms and views in response to a request by client computing device 105 of relevant data from an instance of entity "Customers." This may include, for example, creating a "New" menu item, and creating a "NewItem.aspx" Web page when the "Creator" method is found. When the "Updater" method is found, this may include creating an "Edit" menu item, and creating an "EditItem.aspx" Web page. When the "Deleter" method is found, this may include creating a "Delete" menu item. Additionally, as described in further detail below, when the "Specific Finder" is found, this may include creating a "View" menu item; and during creation of an external data list, creating a new display form "DispItem.aspx", where the "Specific Finder" will be interrogated for the fields that are returned by it and will be added as fields on the "DispItem.aspx" display form.

Similarly, with respect to the entity "Employees," as described above, the FVGR module 510 accesses the schema generation module 505 to request an inventory of the attributes of the entity "Employees." In the example embodiment, the schema generation module 505 performs the inventory and returns the obtained defined attributes, including the "Specific Finder" method, the "Updater" method, and the "Deleter" method.

Subsequently, the FVGR module 510 provisions forms and views in response to a request of external business data by client computing device 105. In example embodiments, this may include, creating views and forms with respect to the "Specific Finder" method, the "Updater" method, and the "Deleter" method, in a manner similar as described above with respect to the "Customers" entity. However, in the example embodiment, the "Creator" method is not found in "Employees" entity, and therefore no associated form, along with any associated links, would be displayed.

Examples described herein include rendering business data on a Web browser application. However the systems and method of the present disclosure can be applicable to any client rendering process such as, for example, rendering Extensible Application Markup Language (XAML) for Windows Presentation Foundation (WPF).

As described above, the platform 140 allows the user to access, view, and manipulate data residing on both internal and external data stores. Examples of such operations are described below with reference to FIGS. 6-8.

Figure 6:
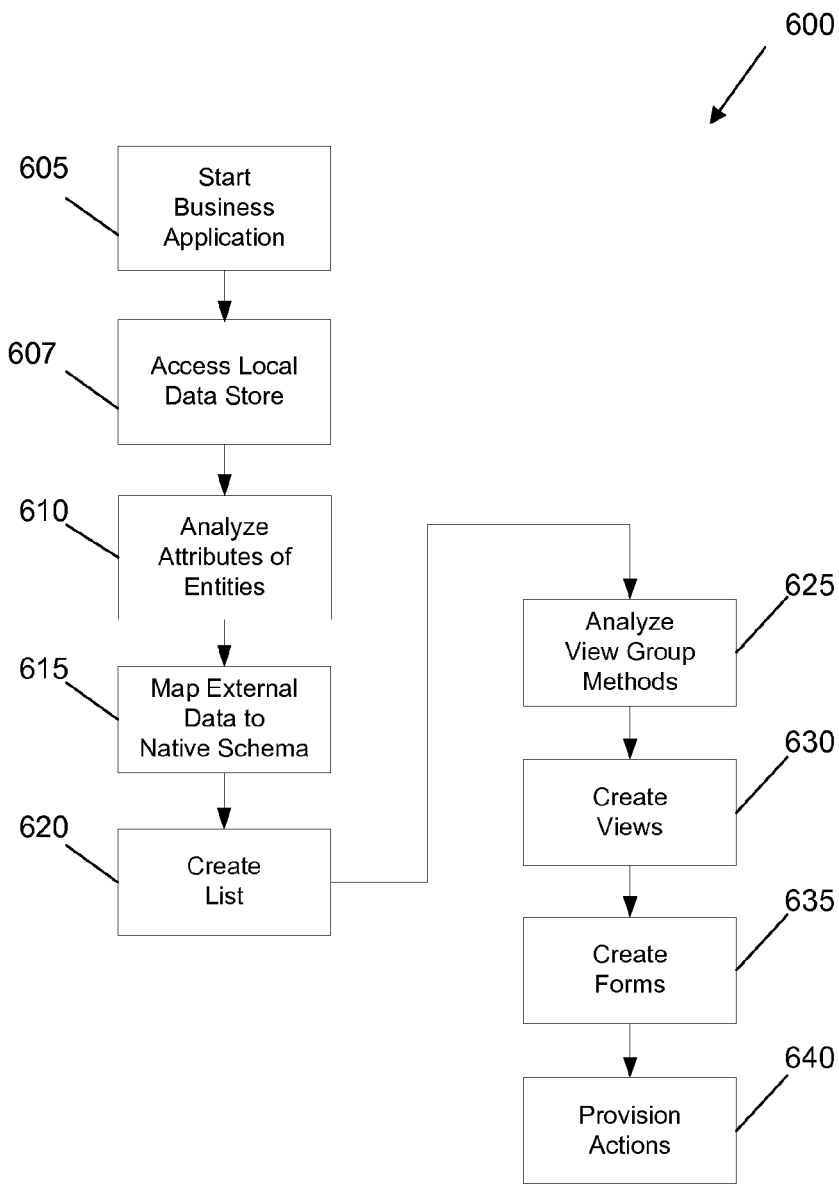
FIG. 6 shows a flowchart for an example method for creation of an external data list.

FIG. 6 shows a flowchart of an example method 600 for creation of an external data list. At operation 605, a business application is instantiated on a server computing device. Subsequently, at operation 607, the server computing device accesses a local data store and performs an inventory of attributes defined within definitions of all entities stored in the local data store.

At operation 610, the server computing device analyzes the inventory of attributes acquired at operation 605 to identify, for example, one or more parameters of a respective external data store that houses business data which will be used to create the external data list.

At operation 615, the server computing device performs a mapping procedure in which data types of data members of the external data source are mapped to data type fields that are native to a preferred business data platform. For example, a "Customer" entity instance may have "First Name" and "Last Name" having data members with a type of "string." The server computing device would map the "First Name" and "Last Name" data members to data type fields having a "string" type that are native to the business data platform. In embodiments in which the preferred business data platform is, for example, SharePoint, operation 615 can map the "First Name" and "Last Name" data members of the "Customer" entity type to a "SPList" field, which is a "string" data type field that enables rendering of the external business data in views and forms within the context of SharePoint. In this manner, the mapping procedure of operation 615 operates to surface external business data into the business data platform as if it is native data.

Next, at operation 620, the server computing device creates an external data list. In example embodiments, the external data list is configured without any respective views or forms. In one aspect, the created external data list is demarked as to allow the business data platform to connect to the respective external data source via the server computing device at any point in time.

At operations 625, the server computing device analyzes the inventory of attributes acquired at operation 605 to determine which of the methods associated with CRUDQ operations are defined within entities stored in the local data store. In certain embodiments, the methods are logically grouped within a View Group assigned to each of respective view and form for a specific entity.

At operation 630, the server computing device creates views for each "Finder" method found in a View Group at operation 625. In example embodiments, the server computing device creates a Web page for each View Group containing a "Finder" method and configures a view Web Part to be rendered on the Web page. In one aspect, the Web Part leverages a Collaborative Application Markup Language (CAML) view XML generated from the "Finder" method and lists all the data type fields that will be returned in the view. In one aspect, the Web page is configured such that when a user browses to the Web page, the "Finder" will execute and the external business data will be fetched from the external data store and of shaped by the server computing device into a form consistent with which a user may expect in the business data platform.

At operation 635, the server computing device creates forms for each "Update" method found in a View Group at operation 625. For example, an "EditForm" is created when a respective View Group supports an "Update" method. In example embodiments, the server computing device creates a Web page for each View Group containing an "Update" method and configures a form Web Part to be rendered on the Web page. At operation 640, the server computing device maps actions associated with respective external business data to custom actions of the business data platform. For example, references to a URL that might be related to the entity are created.

Figure 7:
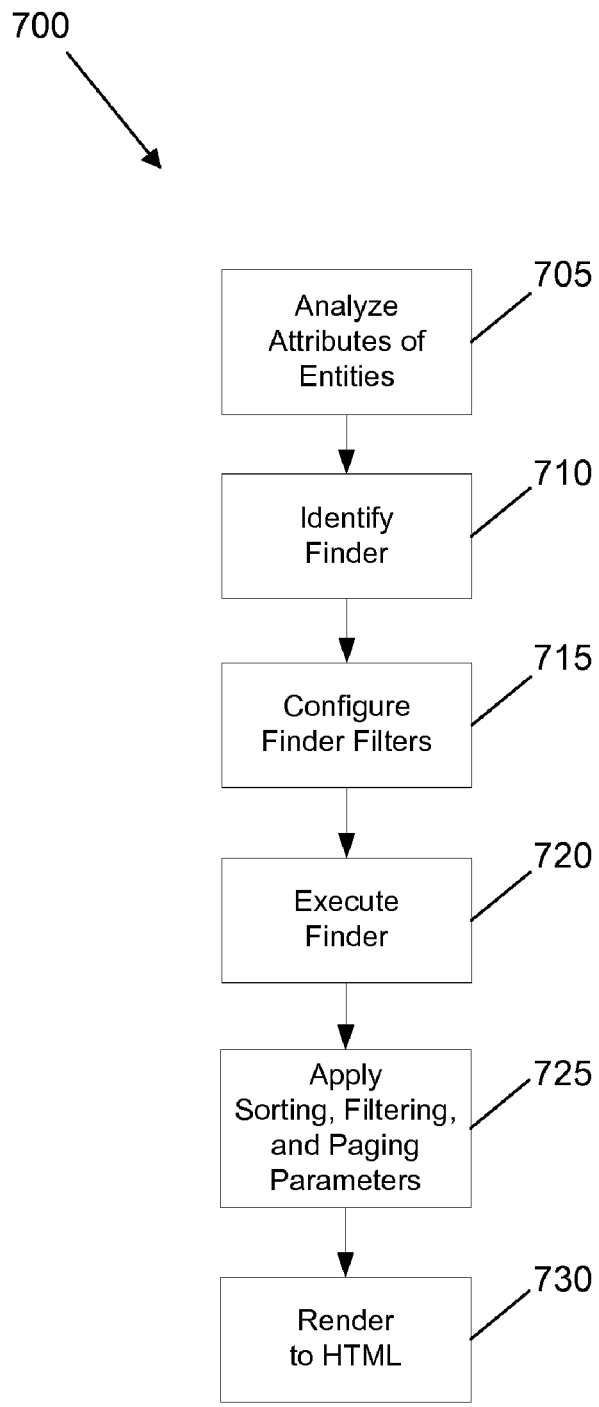
FIG. 7 shows a flowchart for an example method for rendering an external data list view.

FIG. 7 shows a flowchart of an example method 700 for rendering an external data list view. At operation 705, the server computing device accesses a local data store and performs an inventory of attributes defined within definitions of all entities stored in the local data store. The server computing device analyzes the inventory of attributes such that, for example, the server computing device is enabled to call an external business system API that will allow external business data to be fetched. In example embodiments, the inventoried attributes include, for example, a "LobSystemInstance," an "EntityNamespace," an "Entity Name," and "SpecificFinder" name, which fully define a View Group for a respective entity.

At operation 710, for a respective "Finder" method identified in the inventory at operation 705, a "Finder" method name is stored in a view CAML similar to, for example, operation 630 of example method 600, as described above. At operation 715, the server computing device calls an external business data system API to determine a set of filters on the "Finder," and configure the filter values based on the values stored in the view CAML.

At operation 720, the server computing device executes the "Finder" method to retrieve the external business data from the external data source. At operation 725, the retrieved data is reordered according to the view CAML one or more sorting, filtering and paging are applied to the retrieved data. In general, the retrieved data is loaded into memory as a data table and an indexing scheme is used to prevent the need to copy data many times in the table. At operation 730, HTML is rendered to a Web page for the retrieved data conditioned in manner consistent with operation 725. In the example, embodiment, the retrieved data is rendered based on the data type field that is native to the business data platform.

Figure 8:
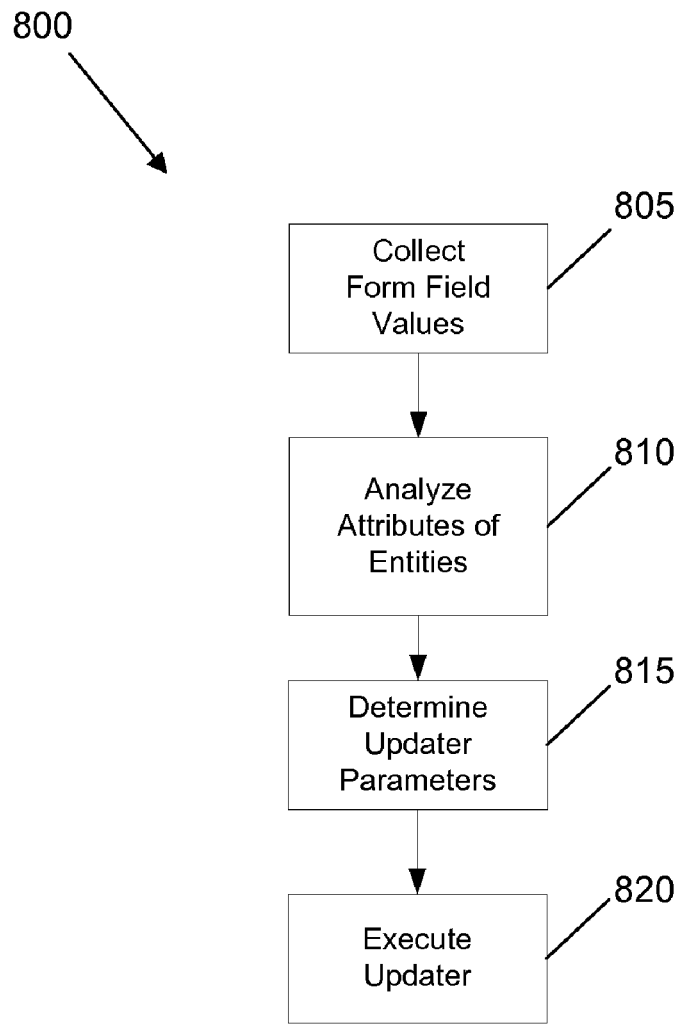
FIG. 8 shows a flowchart for an example method for a new form submission.

FIG. 8 shows a flowchart for an example method 800 for a new form submission. At operation 805, the server computing device collects form field values from the local data store. In example embodiments, operation 805 is implemented by a user selecting "OK" on a rendered Web page Edit form to collect HTML form field values.

At operation 810, the server computing device accesses the local data store and performs an inventory of attributes defined within definitions of all entities stored in the local data store. In this manner, the server computing device is enabled to call an external business data system API that will allow external business data to be fetched. In example embodiments, the inventoried attributes include, for example, a "LobSystemInstance," an "EntityNamespace," an "Entity Name," and "SpecificFinder" name, which fully define a View Group for a respective entity.

At operation 815, the server computing device analyzes the inventory of attributes to determine, for example, "Updater" method parameters defined within definitions of all entities stored in the local data store. In example embodiment, for each field value in a form, an associated "Updater" parameter is set. At operation 825, the server computing device executes the "Updater" method to update external business data in a respective external data store.

Figure 9:
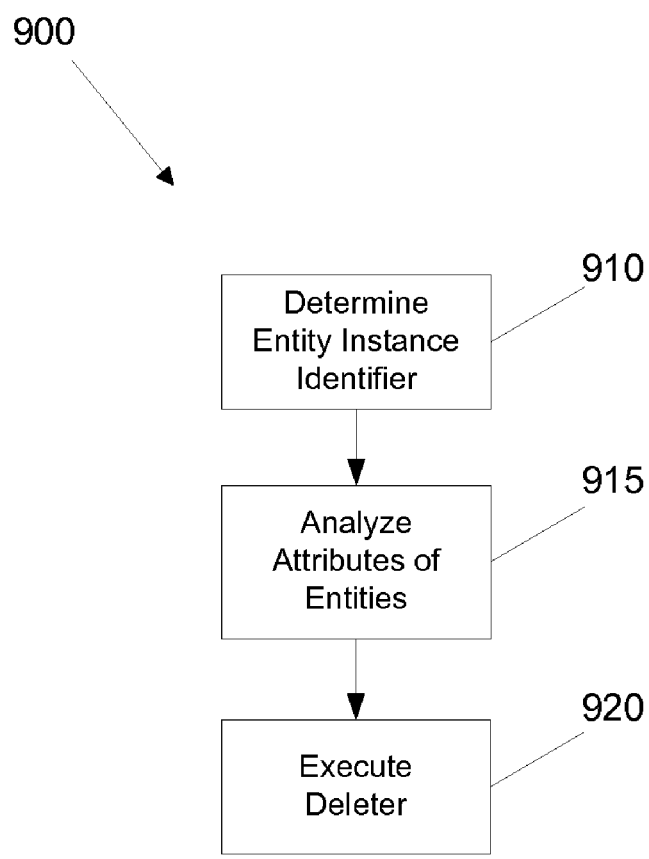
FIG. 9 shows a flowchart for an example method for deletion of a specific instance of an entity.

FIG. 9 shows a flowchart for an example method 900 for deletion of a specific instance of an entity. At operation 910, the server computing device accesses a local data store and performs an inventory of attributes defined within definitions of all entities stored in the local data store. The server computing device analyzes the inventory of attributes acquired such that, for example, an entity "Identifier" attribute that represents an identity of a specific entity, such as a primary key, such that a respective entity can be identified.

At operation 915, the server computing device analyzes the inventory of attributes acquired at operation 910 such that, for example, the server computing device is enabled to call an external business data system API that will allow external business data to be fetched. In example embodiments, the inventoried attributes include, for example, a "LobSystemInstance," an "EntityNamespace," an "Entity Name," and "SpecificFinder" name, which fully define a View Group for a respective entity. At operation 920, the server computing device executes a "Deleter" method.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
   a processing unit;
   a system memory connected to the processing unit, the system memory comprising instructions that, when executed by the processing unit, cause the processing unit to:
      create a business data catalog module that accesses and manipulates data residing on an internal data store and an external data store, wherein the business data catalog module receives a request for data, determines whether the data resides in the internal data store or the external data store, accesses the data residing on the external data store using one or more (application programming interface (API) calls specific to the external data store, wherein information about APIs associated with the external data store is contained in the internal data store, and wherein the information includes permissible operations and one or more pre-defined constraints for rendering and operating on the external data, and creates definitions of business objects that encapsulate a set of defined attributes related to the business objects, the set of defined attributes including: an identifier attribute that represents a persistent identity of a specific entity; a filter attribute that includes criteria for filtering data members returned from the external data store; an actions attribute that includes references of a uniform resource locator related to a specific entity; a relationships attribute that includes a reference to at least one entity having an association defined thereon; and an access attribute that includes methods for setting access rights; and
      create an external data provisioning module that provisions data accessed from the external data store, maps external data from the external data store for presentation on a client computing device, and generates forms and views for presentation and access to a user on the client computing device via a graphical user interface, wherein the forms and views contain content associated with the permissible operations embodied in application programming interfaces of an external business system associated with the external data store, the permissible operations including: a creator method that generates a first selectable menu item that enables the user to create a new entity instance including data for storage in the external data store; a specific finder method that generates a second selectable menu item that enables the user to view data associated with an entity instance; an updater method that generates a third selectable menu item that enables the user to modify at least one property of an entity instance; and a deleter method that generates a fourth selectable menu item that enables the user to delete an entity instance;
      wherein a user can access and manipulate the data from the external data store in a same manner as accessing and manipulating data from the internal data store.

2. The computing device of claim 1, further comprising the external data store that includes the external data, the external data including entities of a business system, methods associated with the entities of the business system, and parameters used by the methods.

3. The computing device of claim 1, wherein the business data catalog module further comprises a parameters module that includes connection parameters and definitions for a plurality of different external data stores.

4. The computing device of claim 3, wherein the connection parameters includes definitions for both internal data stores and the external data stores.

5. The computing device of claim 1, wherein the entity module contains data members that represent scalar types.

6. The computing device of claim 1, wherein the external data provisioning module further comprises a schema generation module that accesses definitions of entities and performs an inventory of the attributes defined therein.

7. The computing device of claim 1, wherein the external data provisioning module maps external data from the external data store for presentation on a client computing device by mapping data types of data members of the external data source to data type fields that are native to the computing device.

8. The computing device of claim 1, comprising a schema generation module that presents the external data from the external data store to the user in a same manner as internal data from the internal data store.

9. A method for obtaining business data, the method comprising:
   creating definitions of business objects that encapsulate a set of defined attributes related to the business objects, the set of defined attributes including: an identifier attribute that represents a persistent identity of a specific entity; a filter attribute that includes criteria for filtering data members returned from the external data store; an actions attribute that includes references of a uniform resource locator related to a specific entity; a relationships attribute that includes a reference to at least one entity having an association defined thereon; and an access attribute that includes methods for setting access rights;
   accessing definitions of entities and performing an inventory of attributes defined therein;
   receiving a request for data from a data store;
   determining whether the data resides on an internal data store or an external data store;
   when the data resides on the external data store, accessing external data on the external data store using one or more API calls specific to the external data store, wherein information about APIs associated with the external data store is contained in the internal data store, the information including permissible operations and one or more pre-defined constraints for rendering and operating on the external data;
   mapping the external data from the external data store;
   generating forms and views for presentation to a user that include content associated with the permissible operations embodied in application programming interfaces of an external business system associated with the external data store, the permissible operations including: a creator method that generates a first selectable menu item that enables the user to create a new entity instance including data for storage in the external data store; a specific finder method that generates a second selectable menu item that enables the user to view data associated with an entity instance; an updater method that generates a third selectable menu item that enables the user to modify at least one property of an entity instance; and a deleter method that generates a fourth selectable menu item that enables the user to delete an entity instance;
   presenting the external data from the external data store to the user in a same manner as internal data from the internal data store; and allowing the user to manipulate the external data store in a same manner as manipulating the internal data from the internal data store.

10. The method of claim 9, further comprising defining data members that represent scalar types.

11. The method of claim 9, wherein mapping the external data from the external data store comprises mapping data types of data members of the external data source to data type fields that are native to the computing device.

12. The method of claim 9, wherein accessing definitions of entities and performing an inventory of attributes defined therein further including accessing connection parameters for a plurality of different external data stores.

13. The method of claim 12, wherein the connection parameters includes definitions for both internal data stores and the external data stores.

14. The method of claim 9, wherein presenting the external data from the external data store to the user in one of the views or forms are presented via a graphical user interface instantiated by a web browser application.

15. A computer readable storage medium having computer-executable instructions that, when executed by a computing device, cause the computing device to perform steps comprising:

creating definitions of business objects that encapsulate a set of defined attributes related to the business objects, the set of defined attributes including: an identifier attribute that represents a persistent identity of a specific entity; a filter attribute that includes criteria for filtering data members returned from the external data store; an actions attribute that includes references of a uniform resource locator related to a specific entity; a relationships attribute that includes a reference to at least one entity having an association defined thereon; and an access attribute that includes methods for setting access rights;

accessing definitions of entities and performing an inventory of the attributes defined therein;

receiving a request for data from a data store;

determining whether the data resides on an internal data store or an external data store;

when the data resides on the external data store, accessing external data on the external data store using one or more API calls specific to the external data store;

mapping the external data from the external data store;

generating forms and views for presentation to a user of the client computing device, wherein the views and forms contain content that is consistent with permissible operations embodied in APIs of an external business system associated with the external data store, wherein information about the APIs associated with the external data store is contained in the internal data store, the information including permissible operations and one or more pre-defined constraints for rendering and operating on the external data, including parameters, security authorization information, and filtering information, the permissible operations including: a creator method that generates a first selectable menu item that enables the user to create a new entity instance including data for storage in the external data store; a specific finder method that generates a second selectable menu item that enables the user to view data associated with an entity instance; an updater method that generates a third selectable menu item that enables the user to modify at least one property of an entity instance; and a deleter method that generates a fourth selectable menu item that enables the user to delete an entity instance;

presenting the external data from the external data store to the user in one of the views or forms in a same manner as internal data from the internal data store; and allowing the user to manipulate the external data store in a same manner as manipulating the internal data from the internal data store.

16. The computer readable storage medium of claim 15, further comprising defining data members that represent scalar types.

17. The computer readable storage medium of claim 15, mapping the external data from the external data store comprises mapping data types of data members of the external data source to data type fields that are native to the computing device.

18. The computer readable storage medium of claim 15, wherein accessing definitions of entities and performing an inventory of attributes defined therein further including accessing connection parameters for a plurality of different external data stores.

19. The computer readable storage medium of claim 18, wherein the connection parameters includes definitions for both internal data stores and the external data stores.

20. The computer readable storage medium of claim 15, wherein presenting the external data from the external data store to the user in one of the views or forms are presented via a graphical user interface instantiated by a web browser application.

* * * * *